J. M. DICK'S
POTATO DIGGER.
105922 PATENTED AUG. 2 1870.
Fig. I
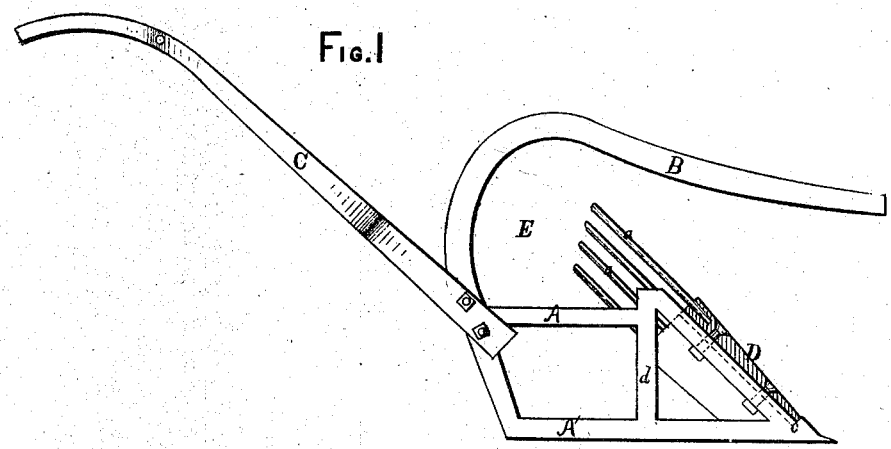
Fig. II
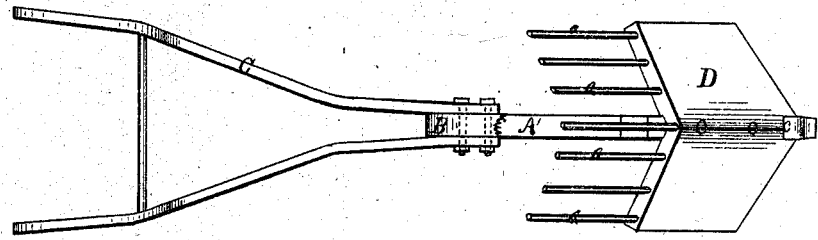
WITNESSES.
INVENTOR.

United States Patent Office.

JAMES MILLEN DICK, OF BUFFALO, NEW YORK, ASSIGNOR TO HIMSELF AND WILLIAM H. ALBRO, OF SAME PLACE.

*Letters Patent No. 105,922, dated August 2, 1870.*

IMPROVEMENT IN FRAMES FOR POTATO-DIGGERS AND SHOVEL-PLOWS.

The Schedule referred to in these Letters Patent and making part of the same.

*To all whom it may concern:*

Be it known that I, JAMES MILLEN DICK, of Buffalo, in the county of Erie and State of New York, have made certain new and useful Improvements in "Frames for Potato-Diggers and Shovel-Plows," of which the following is a specification.

Nature of the Invention.

This invention consists in the special construction and form of the frame to which the digger or plow-point is attached, as hereinafter described.

General Description.

In the drawing—

Figure 1 is a side elevation, and
Figure 2 is a plan.
A A' is the frame;
B, the beam;
C, the handles; and
D, the digger, the latter having fingers or riddlers $a\ a'$, for separating the potatoes as they go over.

The beam and the frame are formed in one piece, as shown, the former curving upward high at the rear, as shown at B, so as to form a deep space at E, for the mass of earth and vines to fall into as they pass over the top of the fingers or riddlers, and thus prevent clogging.

The sides A A' are parallel, and form the top and bottom of the frame, the latter being of greater length, to form the opening point running beneath the rows.

From the extreme point an angle-bar, $c$, extends up to the upper side, and forms the attachment for the digger-share D.

An intermediate vertical bar, $d$, connects the top and bottom of the frame, as shown.

The novelty in my case is the construction and form of the frame, having the two parallel sides A A', the angular face $e$, and cross-bar $d$. This construction secures the maximum of strength, with the utmost lightness and the greatest economy of space and form.

The frame is made bracing in the direction of motion, while its lateral width or thickness is so small that it can be readily turned or induced to follow the row in all its windings. The narrow width also makes it serve as a sensitive fulcrum, in guiding and turning the plow.

Another important feature is the large open space E, made by the high curve of the beam, said space allowing the potatoes to be thoroughly sifted as they fall, and enabling the vines to clear. The narrow frame facilitates this action.

This construction of the frame is as applicable to shovel-plows as to potato-diggers.

What I claim as my invention is—

The construction of the frame with the parallel sides A A', the bar $c$, and cross-bar $d$, and having the beam formed in a single piece therewith, in the manner and for the purpose herein described.

In witness whereof I have hereunto signed my name in the presence of two subscribing witnesses.

JAMES M. DICK.

Witnesses
LYMAN P. PERKINS,
C. N. WOODWARD.